United States Patent [19]

Herbermann

[11] Patent Number: 5,249,529
[45] Date of Patent: Oct. 5, 1993

[54] SELF-NULLING HYBRED MAGLEV SUSPENSION

[75] Inventor: Richard J. Herbermann, Huntington, N.Y.

[73] Assignee: Grumman Aerospace Corporation, Bethpage, N.Y.

[21] Appl. No.: 991,448

[22] Filed: Dec. 16, 1992

[51] Int. Cl.$^5$ .......................................... B60L 13/00
[52] U.S. Cl. ................... 104/281; 104/284; 104/286
[58] Field of Search ............. 104/281, 282, 284, 285, 104/286; 310/90.5; 505/902, 903, 908

[56] References Cited

U.S. PATENT DOCUMENTS

| | | | |
|---|---|---|---|
| 3,783,794 | 1/1974 | Gopfert et al. | 104/286 |
| 3,797,403 | 3/1974 | Schwarzler et al. | 104/284 |
| 3,849,724 | 11/1974 | Ghibu et al. | 104/284 |
| 3,884,154 | 5/1975 | Marten | 104/282 |
| 4,900,962 | 2/1990 | Hockney et al. | 104/284 |

FOREIGN PATENT DOCUMENTS

| | | | |
|---|---|---|---|
| 2238402 | 1/1983 | Fed. Rep. of Germany | 104/282 |
| 0045106 | 2/1991 | Japan | 104/284 |
| 0159503 | 7/1991 | Japan | 104/281 |
| 0645880 | 2/1979 | U.S.S.R. | 104/284 |

*Primary Examiner*—Mark T. Le
*Attorney, Agent, or Firm*—Pollock, VandeSande & Priddy

[57] ABSTRACT

Normal and superconducting magnets are employed in an electromagnetic (attractive) suspension system for MAGLEV vehicles. The super conducting magnet provides the principal magnetomotive force (MMF) to the system while the normal electromagnet compensates for dynamic or transient loads on the system that vary the suspension gap. The rapid variations are slowly compensated for by the superconducting magnet thereby minimizing heat generation by a superconducting coil.

4 Claims, 1 Drawing Sheet

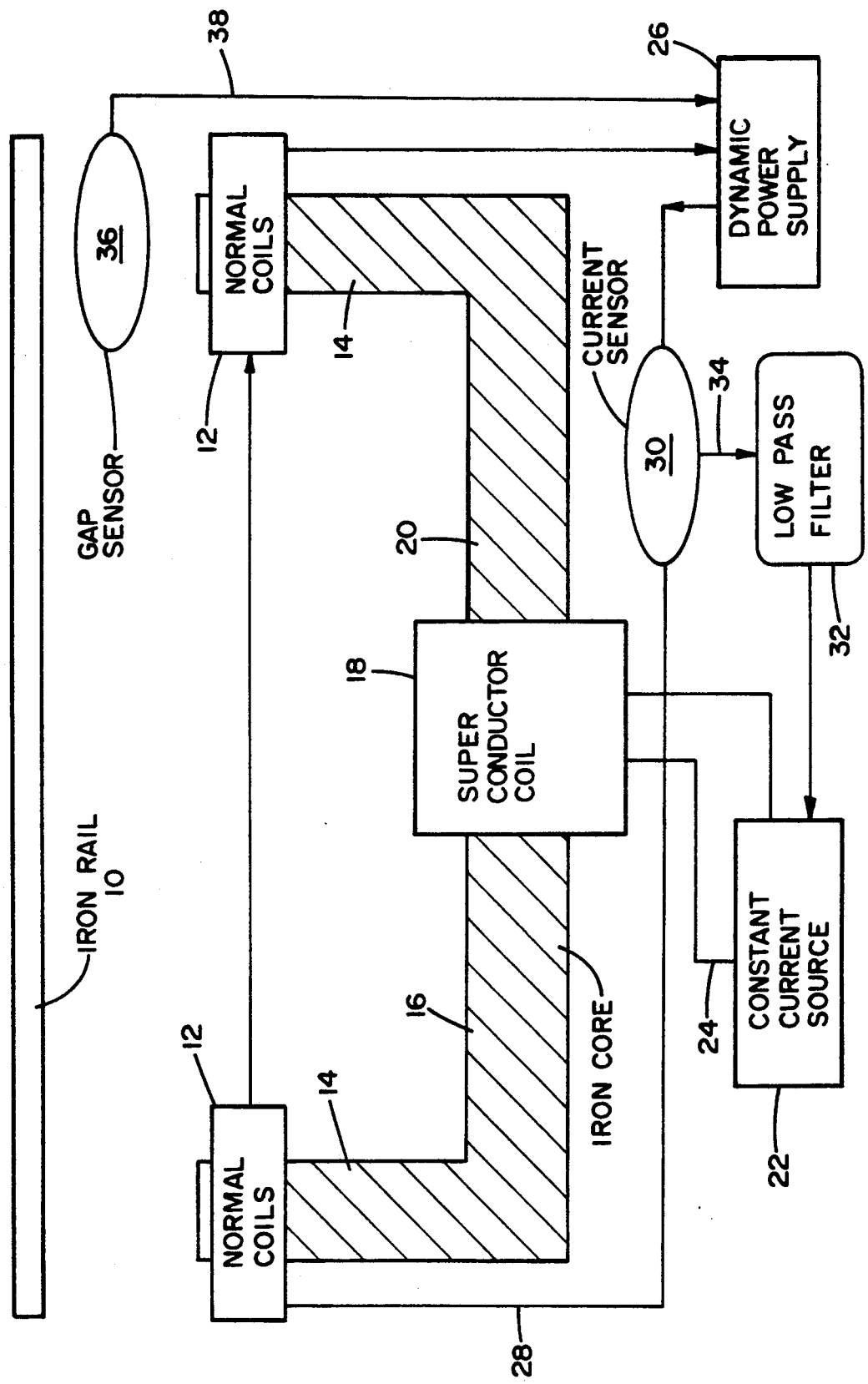

SELF-NULLING HYBRED MAGLEV SUSPENSION

FIELD OF THE INVENTION

The present invention relates to an electromagnetic suspension for a high-speed transportation system, and more particularly to a control system for electromagnets employed in such a suspension.

BACKGROUND OF THE INVENTION

Conventional driving means for rail transportation systems, including driving motors and wheels, are in practice impossible to use at speeds of above 300 mph. Problems with conventional systems include running resistance, adhesion between the rails and the wheels, wind disturbances, inertial effects, road bed irregularity, and propulsion difficulties. To overcome these problems, a variety of systems have been proposed which use electromagnetic suspension and stabilization systems, instead of wheels and mechanical suspensions, to reduce dynamic friction and, consequently, enable super high speed operation while at the same time reducing energy consumption. The amount of energy used in such a system may further be reduced by the use of superconductor technology, in which electric power is delivered through wires having virtually no internal electrical resistance, thus improving the performance, cost, safety, and environmental impact, as well as the energy efficiency of the system.

Magnetic levitation (MAGLEV) technology may be broadly categorized in terms of two types of primary suspension systems: the attractive, or electromagnetic suspension (EMS) systems, and the repulsive, or electrodynamic suspension (EDS) system.

The EMS system is exemplified by the German Transrapid System, which has been under development for about 20 years and is nearing commercial application. This system uses normal (non-superconducting) electromagnets to levitate the vehicle by attraction to ferromagnetic rails mounted on a guideway.

The present development of the Transrapid System has several significant advantages and disadvantages. On the positive side are its low energy consumption, resistance to derailing, and low magnetic field strength in the passenger cabin. Disadvantages of the system include the small clearance gap of one cm (0.4 inch) required between the magnet poles and the guideway (resulting in increases in the cost of construction and maintenance), high vehicle weight owing to the use of normal magnet systems, and limited payload of freight capability.

The Japanese, on the other hand, have built and tested an EDS system (the MLU series) at speeds approaching 300 mph. Their system, unlike the German transrapid, utilizes superconducting magnet technology and therefore operates with a large clearance gap (4 to 6 inches). However, the air-core superconducting system used by the Japanese Railway experiences a magnetic quench due to dynamic effects, suffers from the disadvantage that magnetic field levels in the vehicles are very high, and requires significant additional structure supports for the load-bearing coils. The need for supports to sustain a load on the coils results in the problem of heat loss from the coils to the warm structural supports. Also, EDS systems require a relatively complex guideway, and can only levitate when a certain speed is achieved, necessitating auxiliary wheels. An example of an air-core superconducting system for MAGLEV applications is disclosed in U.S. Pat. No. 3,913,493.

Neither of the two existing MAGLEV systems has therefore proved completely satisfactory. By sacrificing the use of ferromagnetic rails to contain the magnetic flux as in conventional EMS magnetic suspensions, air-core superconductor coils such as those used in the Japanese system present significant problems because of the large and unconstrained magnetic fields generated by the coils and also because of the loads which the coils are required to bear. While the German EMS system does not present such problems, the use of conventional electromagnets limits the attractive force possible for a given current and therefore decreases the gap size, as noted above.

A contemporary development by the present assignee is directed to an improvement in this area of technology, namely an approach incorporating the best features of both the German EMS system and the Japanese EDS system without incorporating the disadvantages of either. The contemporary development is directed to a design of an EMS system which utilizes superconductive technology and yet utilizes external magnetic field levels which are minimized.

The contemporary development is more specifically directed to a MAGLEV suspension system in which the size of the air gap between the vehicle and a guideway is maximized by using superconducting coils to increase the number of ampere-turns on the electromagnet while at the same time minimizing the load on the coils by providing an air core for the coils. In this approach, the coil may be effectively isolated from the guideway, thereby facilitating cooling of the superconducting coils and minimizing heat loss.

The objectives of the contemporary development are achieved by providing the superconducting coils with iron cores to confine the magnetic flux within the iron core and a rail provided on the guideway, the iron core serving to bear the weight of the vehicle while constraining the magnetic flux to minimize stray magnetic fields. The use of iron core superconductor magnets also allows the vehicle weight to be supported by the iron core rather than the coils, reducing heat leak problems associated with transferring large loads from the superconducting coils to the relatively warm supporting structure.

BRIEF DESCRIPTION OF THE PRESENT INVENTION

The present invention addresses the problem of maintaining a minimized air gap in response to dynamic changes on a MAGLEV suspension system.

The electromagnetic (attractive) suspension system for MAGLEV vehicles requires that the current in the coil supplying the magnetomotive (MMF) force to the levitation magnets be capable of varying at a rate of at least 20 Hz. Further, in order to achieve a large air gap between the magnet pole piece and the iron rail, a large (MMF) is required. The first requirement would place a heavy burden on a superconducting magnet system because the rapidly varying fields produced by the varying current would generate heat in the superconductor increasing refrigeration requirements. This dictates the use of a normal magnet to generate the rapidly varying fields. The second requirement mandates a large number of ampere turns which can be accomplished most easily using a superconducting magnet.

This invention conbines both a normal and superconducting magnet in a configuration which takes advantage of the best features of both the superconducting and normal magnets.

By virtue of the present improvement, an electromagnetic suspension system is able to exhibit the following features:

The superconducting coil supplies most of the MMF with its attendant low power consumption and high ampere turns. Further, the rate of change of current in the superconducting coil is kept low to minimize heat generated. Additionaly, the rapid response required to stabilize the vehicle is provided by the normal coils but with relatively low power consumption because they are backed up by the superconducting coil.

BRIEF DESCRIPTION OF THE FIGURE

The above-mentioned objects and advantages of the present invention will be more clearly understood when considered in conjunction with the accompanying drawing, in which:

the FIGURE is a block diagram of the present invention.

DETAILED DESCRIPTION OF THE INVENTION

Reference numeral 10 indicates an iron rail from which an electromagnetic coil assembly is suspended. The coil assembly includes normal electromagnetic coils 12 mounted to the legs 14 of an iron core 16. A superconductor coil 18 is mounted to the bight 20 of the core 16. A source 22 supplies current, via leads 24, to the superconductor coil 18. A conventional dynamic power supply 26 is connected in series with the normal electromagnetic coils 12. A conventional gap sensor 36 measures changes in the gap between the iron core 16 and the iron rail 10. Signals from the sensor are provided as a control input along lead 38 to the dynamic power supply 26. A current sensor 30 is connected to the output of the dynamic power supply 26 by means of lead 28, this lead carrying current to the normal coils 12. A conventional low pass filter 32, operating at a cut-off frequency of approximately 1 Hz, is connected by lead 34 to an alternate output of the current sensor 30 and provides a low pass filtered signal to the control terminal of the source 22.

In operation of the device, the dynamic power supply is energized and current flows through the normal coils. As long as the gap is larger than the prescribed distance, current will flow in the normal coils. Since this current is not sufficient to levitate the vehicle, nothing else happens. At the same time, however, the current sensor in the normal coil line feeds information through the low pass filter to the source increasing the set point of the source. The current will continue to increase until levitation takes place. When the gap sensor detects the correct gap, current in the normal coils will be reduced to maintain the correct gap. However, the current sensor is still detecting current in the normal coils and will slowly increase the current in the superconducting coil requiring further reduction in the normal coil current to maintain the correct gap. This process will continue until no current flows in the normal coils and all the magnetomotive force is being supplied by the superconducting coil. When a transient occurs causing the gap to change, the current in the normal coils will immediately change to correct the gap. Following this, the current sensor will cause the current in the superconducting coil to change again returning the normal coil to zero.

The source is used to drive the superconducting coil in order to maintain the current constant in the presence of the changing flux caused by variations in the normal coil current. For this reason the response time of the source must be fast when compared to the highest frequency anticipated in the normal coils.

It should be understood that the invention is not limited to the exact details of construction shown and described herein for obvious modifications will occur to persons skilled in the art.

I claim:

1. An electromagnetic elevation system for MAGLEV vehicles comprising:
    a plurality of electromagnetic coils mounted onto a core;
    a dynamic power supply connected to the coils for providing them with current;
    means for sensing a gap between an iron rail and the core;
    means for connecting signals from the sensing means to a control input of the power supply for varying current output therefrom as a function of changes in the gap;
    at least one superconducting coil mounted to the core;
    a source connected to the superconducting coil;
    means connected to an output of the dynamic supply for sensing its output current level; and
    a low pass filter connected at its input to an output of the current level sensing means, and at its output to a control input of the source.

2. The system set forth in claim 1 wherein the low pass filter has a cutoff frequency of 1 Hz.

3. The system set forth in claim 1 wherein the core is a generally U-shaped member having two legs separated by a central bight portion; and
    further wherein the electromagnetic coils are respectively mounted to the legs, while the superconducting coil is mounted to the bight section.

4. A method for controlling the magnetomotive forces generated by an electromagnet assembly utilized in a MAGLEV system, comprising the steps:
    providing a constant current to a superconducting coil;
    sensing variations in a gap between a core of the assembly and an iron vehicle rail;
    generating a control signal corresponding to sensed variations;
    supplying current to electromagnetic coils as a function of the control signal;
    sensing current levels supplied to the electromagnetic coils;
    generating signals corresponding to sensed current levels;
    low pass filtering the sensed current level signals; and
    feeding back a filtered control signal to a source of the constant current for maintaining a constant current level therefrom.

* * * * *